United States Patent
Knowles et al.

(10) Patent No.: US 7,025,390 B2
(45) Date of Patent: Apr. 11, 2006

(54) METHOD AND APPARATUS FOR CONNECTING COUPLER FITTINGS TO CONDUIT SECTIONS

(75) Inventors: Charles Newton Knowles, Clayton, OH (US); James Paul Orban, Tipp City, OH (US); Sasenjko Radzepagic, Middletown, OH (US)

(73) Assignee: Wolf Creek Company, Inc., Trotwood, OH (US)

( * ) Notice: Subject to any disclaimer, the term of this patent is extended or adjusted under 35 U.S.C. 154(b) by 20 days.

(21) Appl. No.: 10/602,412

(22) Filed: Jun. 23, 2003

(65) Prior Publication Data

US 2004/0164550 A1    Aug. 26, 2004

Related U.S. Application Data

(60) Provisional application No. 60/449,096, filed on Feb. 20, 2003.

(51) Int. Cl.
*F16L 33/00*    (2006.01)

(52) U.S. Cl. ............ 285/255; 285/242; 285/259; 285/261

(58) Field of Classification Search ............ 285/242, 285/245, 252, 254, 255, 259, 261
See application file for complete search history.

(56) References Cited

U.S. PATENT DOCUMENTS

| | | | |
|---|---|---|---|
| 134,158 A * | 12/1872 | Nutting | 285/114 |
| 186,855 A * | 1/1877 | Leland | 285/255 |
| 900,974 A * | 10/1908 | Andrews | 285/243 |
| 1,426,086 A * | 8/1922 | Lowrey | 285/114 |
| 1,532,886 A | 4/1925 | Cowles | |
| 2,410,600 A | 11/1946 | Cowles | |
| 3,210,100 A | 10/1965 | Lowles et al. | |
| 3,578,360 A | 5/1971 | Eliot | |
| 4,088,349 A * | 5/1978 | Guest | 285/255 |
| 4,278,279 A * | 7/1981 | Zimmerman | 285/255 |
| 4,522,435 A | 6/1985 | Miller et al. | |
| 4,603,890 A | 8/1986 | Huppee | |
| 4,607,867 A * | 8/1986 | Jansen | 285/242 |
| 4,729,583 A | 3/1988 | Lalikos et al. | |

(Continued)

FOREIGN PATENT DOCUMENTS

DE    32 43 365 A1    5/1984

(Continued)

*Primary Examiner*—David Bochna
(74) *Attorney, Agent, or Firm*—Rankin, Hill, Porter & Clark LLP (57) ABSTRACT

A preferred apparatus for connecting a fitting to a conduit section comprises a rigid insert designed to be affixed to the fitting and one or more retainers designed to fit over the external surface of the conduit section. A preferred insert includes at least two axially-spaced, raised detents. Suitable retainers include rigid, one-piece collars and clamps. An especially preferred method for connecting the coupler fittings and the section of pipe comprises the steps of positioning a one-piece collar over the external surface of the conduit section; pressing the insert into a receiving end of the conduit section; and pushing the one-piece collar along the external surface of the conduit section toward the receiving end to substantially align the one-piece collar between two axially-spaced, raised detents on the insert. Most preferably, a seal is positioned between the two axially-spaced, raised detents. The preferred retainer cinches the wall of the conduit section against the outer surface of the insert between the two raised detents so as to decrease the likelihood that the conduit section will leak or slip from the fitting during use.

39 Claims, 10 Drawing Sheets

U.S. PATENT DOCUMENTS

| | | | |
|---|---|---|---|
| 4,906,030 A | | 3/1990 | Yokomatsu et al. |
| 5,044,671 A | | 9/1991 | Chisnell et al. |
| 5,096,231 A | | 3/1992 | Chisnell et al. |
| 5,332,269 A | | 7/1994 | Homm |
| 5,378,023 A | | 1/1995 | Olbrich |
| 5,470,113 A | * | 11/1995 | Schwalm et al. ........... 285/255 |
| 5,558,375 A | * | 9/1996 | Newman ..................... 285/23 |
| 5,667,252 A | * | 9/1997 | Schafer et al. ................ 285/15 |
| 5,931,510 A | | 8/1999 | Mathew et al. |
| 5,961,157 A | | 10/1999 | Baron et al. |
| 6,010,162 A | | 1/2000 | Grau et al. |
| 6,099,045 A | * | 8/2000 | Pirona ........................ 285/256 |
| 6,158,784 A | * | 12/2000 | Lavender .................... 285/239 |
| 6,199,915 B1 | | 3/2001 | Becker |
| 6,485,064 B1 | | 11/2002 | Davidson |
| 6,709,028 B1 | * | 3/2004 | Dallai et al. ................. 285/420 |
| 6,715,800 B1 | * | 4/2004 | Hennig ....................... 285/259 |

FOREIGN PATENT DOCUMENTS

| | | |
|---|---|---|
| DE | 42 31 623 A1 | 3/1994 |
| FR | 2 675 880 A1 | 10/1992 |

\* cited by examiner

METHOD AND APPARATUS FOR CONNECTING COUPLER FITTINGS TO CONDUIT SECTIONS

BACKGROUND OF THE INVENTION

1. Field of the Invention

The present invention relates to methods and apparatus for connecting coupler members to conduit sections. More particularly, the invention relates to methods and apparatus for connecting rigid, most preferably metal, coupler members to resilient conduits such as, without limitation, resilient pipe and flexible hose.

2. Description of Related Art

Conduit such as pipe or hose typically is manufactured in lengths or sections which are coupled together during construction or installation to form a pipeline. Couplers affixed to the ends of the conduit sections couple the sections together. Often, such couplers include fittings affixed to adjoining ends of adjacent conduit sections as well as mechanisms for permanently or detachably connecting the fittings to each other to form fluid-tight joints.

One type of coupling used for connecting such conduit sections, available from Röhren- und Pumpenwerk Bauer GmbH of Voitsberg, Austria, includes separate male and female coupler fittings affixed to adjoining ends of the sections as well as a clamping sleeve slidably installed behind the male fitting. The male fitting consists of a spherical shell having openings at opposite ends to provide a passage through the shell. The female fitting includes a hemispherical socket for receiving the spherical shell. The male fitting fits into the hemispherical socket of the female fitting. A rubber gasket seated in the female fitting helps to form a fluid-tight seal between the male and female fittings. The clamping sleeve includes hooks for securing the sleeve to the female fitting so as to clamp the male fitting between the clamping sleeve and the female fitting.

This type of coupling permits the conduit section connected to the male fitting to pivot up to about 15°–30° relative to a centerline of the conduit section to which the female fitting is connected. This arrangement allows for curvature in a pipeline formed using the coupling so as to adapt to terrain on which the pipe line is placed.

Often, sections of pipe used in pipeline applications are formed from polymeric materials. For example, high density polyethylene ("HDPE") pipe is well suited for applications such as mining, road construction, fresh water systems and wastewater systems, among others. HDPE material is lightweight compared to other piping materials such as metals. HDPE pipe is durable-its resiliency provides protection against damage from external loads, vibrations and pressure surges such as water hammer. It is resistant to scale build-up as well as to damage from most aggressive chemicals and corrosive agents.

Flexible hosing is well suited to other applications. One popular type of flexible hosing includes a flexible polymeric material such as a rubber material reinforced by a woven material formed from metal, ceramic or polymer. Known applications require coupling of flexible hosing at either the suction or discharge ends of pumping systems. Tremendous amounts of thrust can be generated at the discharge ends of the sections of hosing in such applications.

The use of a rigid materials such as metal to form couplings helps to ensure the dimensional stability of the couplings and, consequently, the tightness of the seals between the coupler fittings. One drawback to the use of couplers formed from rigid materials such as metals in joining sections polymeric pipe and flexible hose is the need for a mechanism to connect the fittings to the ends of the conduit sections. Another drawback to the use of metal couplings in connection with plastic pipes and flexible hoses the lies in the difference between the thermal expansion rates of the materials forming the fittings and the conduit, which can lead to leakage between the section of pipe and the coupler fitting as the environmental temperature varies. Typically, this problem is addressed by increasing the wall thickness of the pipe or hose above the minimum required to contain the anticipated fluid pressure so as to maintain engagement between the conduit section and the coupler. There remains a need in the art for a relatively simple and inexpensive method, and for a relatively simple and inexpensive apparatus, for connecting a coupling formed from a rigid material such as metal to a section of resilient conduit.

SUMMARY OF THE INVENTION

This need and others are addressed by a method and apparatus for connecting a fitting to a conduit section. (For present purposes, "conduit" broadly refers to any structure capable of conducting a fluid.) Preferred apparatus in accordance with the invention comprises a rigid insert designed to be affixed to the fitting and one or more retainers designed to fit over an external surface of the conduit section. The preferred insert includes a body defining a central lumen.

In accordance with one especially preferred embodiment, the insert includes two axially-spaced, raised detents and the retainer is in substantial alignment between the two raised detents. Suitable retainers include rigid, one-piece collars and clamps. The preferred retainer cinches the wall of the conduit section against the outer surface of the insert between the two raised detents so as to decrease the likelihood that the section will slip or come loose from the fitting during use. The insert optionally includes one or more smaller raised detents between the two axially-spaced, raised detents to increase the engagement between the insert and the conduit section to further decrease the likelihood of slippage.

Without wishing to be bound by any theory of operation, it is believed that the one or more retainers serve to clamp the conduit section against the insert even when the conduit section, the insert and the one-piece collar expand or contract with change in temperature. This is particularly true when the insert and the one-piece collar comprise the same material or have similar rates of thermal expansion. Consequently, the designer need not increase the wall thickness of the conduit section beyond the minimum thickness required to contain the anticipated fluid pressure, thereby increasing the cost, as a means of reducing the risk of leakage due to temperature changes.

Most preferably, a seal is positioned between the two axially-spaced, raised detents. A preferred arrangement includes a retainer substantially aligned between the two raised detents cinches the pipe against the seal to improve the tightness of the seal between the wall of the conduit section and the insert.

In accordance with another especially preferred embodiment, the preferred retainer is a rigid, one-piece collar having a first end, a second end and an opening extending from the first end to the second end large enough to receive the insert and the wall of the conduit section. A preferred method for connecting the coupler fittings and a section of resilient conduit comprises the steps of positioning the one-piece collar over the external surface of the conduit section; pressing the insert into a receiving end of the conduit section; and pushing the one-piece collar along the external surface of the conduit section toward the receiving end to substantially align the one-piece collar between the two axially-spaced, raised detents.

In an especially preferred one-piece collar, the opening is flared from a position intermediate the first and second ends. The first end of the one-piece collar faces the receiving end of the conduit section (and the fitting once the fitting is connected to the section). A preferred method for connecting the fitting and the conduit section comprises the steps of positioning the one-piece collar over the external surface of the section; pressing the insert into a receiving end of the section; and pushing the one-piece collar along the external surface of the conduit section toward the receiving end of the section to substantially align the one-piece collar between the two axially-spaced, raised detents. The flaring of the opening facilitates the steps of pressing the insert into the receiving end and of pushing the one-piece collar toward the receiving end.

In accordance with an embodiment especially preferred for use in connecting sections of flexible hose, the insert includes three or more axially-spaced, raised detents and the apparatus includes two or more retainers positioned between adjacent pairs of raised detents. Preferred retainers include rigid, one-piece collars and clamps. This configuration further increases the engagement between the insert and the conduit section (e.g., the section of flexible hose) so as to decrease the likelihood of slippage when the section is subjected to high thrusts. The insert optionally includes one or more smaller raised detents between the adjacent pairs of the three or more axially-spaced, raised detents to further increase the engagement between the insert and the conduit section to further decrease the likelihood of slippage.

The preferred insert includes a cylindrical body and the preferred raised detents are annular. The use of annular, raised detents improves the engagement between the insert and the conduit section so as to tighten the seal between the two. Nevertheless, the present invention is not limited to inserts having raised detents of any size or configuration. Likewise, the present invention is not limited to inserts or sections of pipe having cylindrical cross-sections.

In accordance with yet another preferred embodiment of the invention, the insert includes a staple mounted on the outer surface of the insert. A strap or fetter includes a strap middle section which passes through the staple and a pair of opposed strap end portions, one of which engages the retainer. An especially preferred method for connecting a coupler fitting to a conduit section includes the additional straps of threading the strap or fetter through the staple, bending the strap near the staple and pushing the one-piece collar over one of the strap end portions. So arranged, the engagement of the strap end portions with the retainer serves to bind the insert, retainer and conduit section together.

The preferred apparatus is relatively simple to manufacture and install. It also is relatively inexpensive to produce, requiring a minimum of machining.

Therefore, it is one object of the invention to provide an improved method and apparatus for connecting a fitting to a conduit section. Other objects and advantages of the invention will be apparent from the following description, the accompanying drawings and the appended claims.

DETAILED DESCRIPTION OF THE PREFERRED EMBODIMENT

Figure 1:
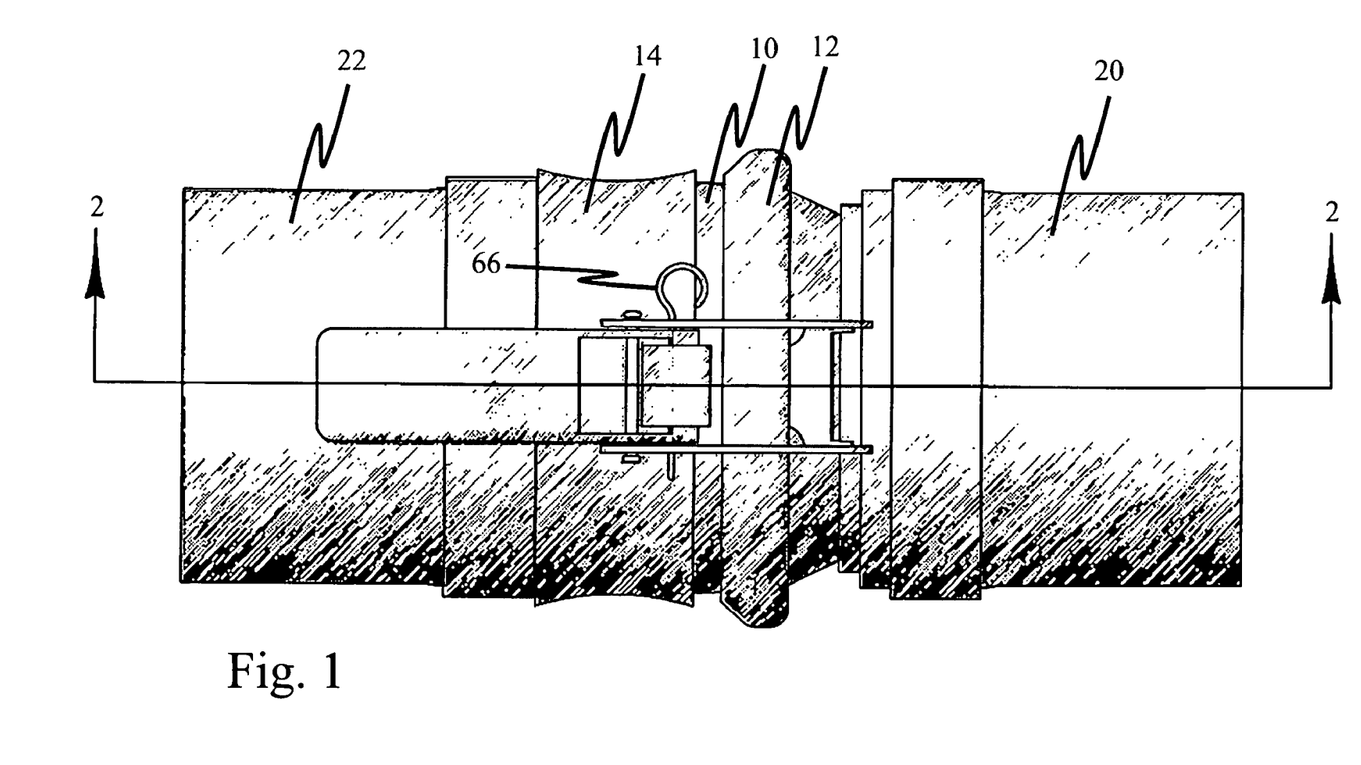
FIG. 1 is a side elevational view of two sections of pipe coupled at adjacent ends by means of fittings connected to the sections by means of a first preferred embodiment of the present invention.
Figure 2:
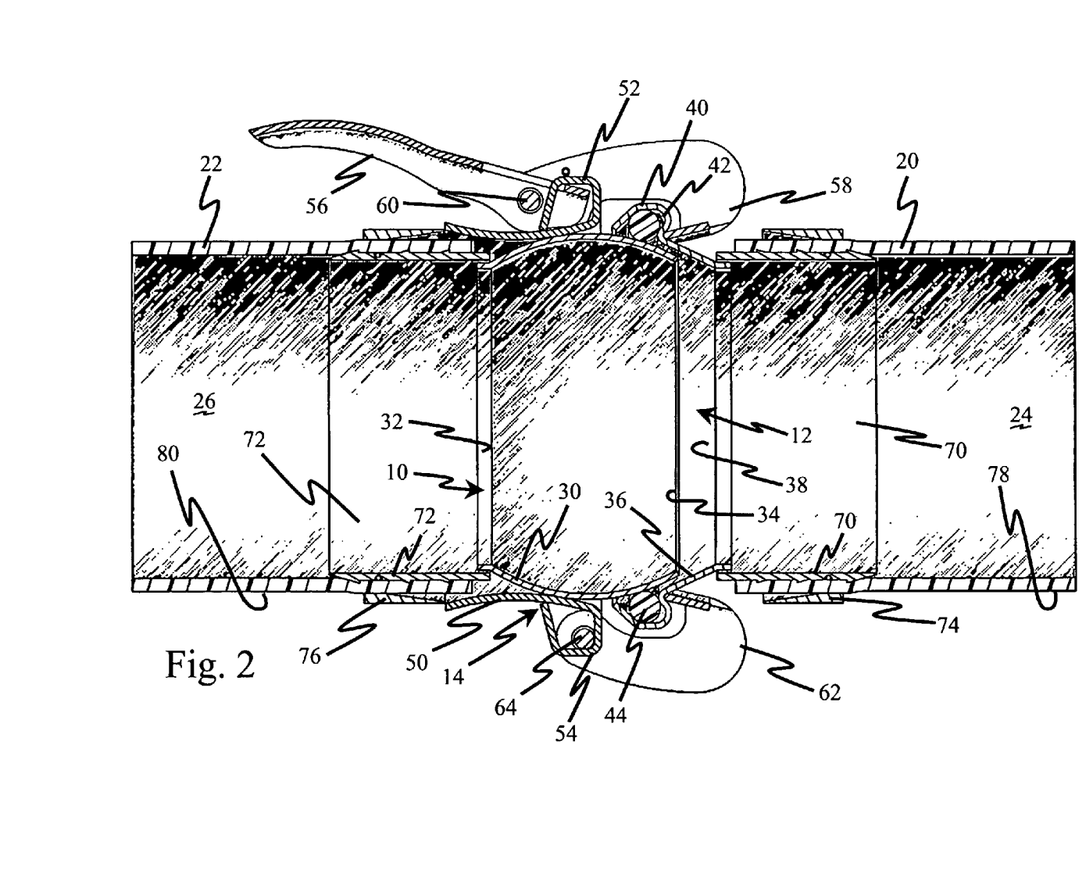
FIG. 2 is a sectional view of the structure of FIG. 1, taken along the line 2—2 in FIG. 1.

FIG. 1 shows a rigid male fitting 10, a rigid female fitting 12 and a rigid clamping sleeve 14 of a preferred coupler connected to sections of pipe 20 and 22. Referring to FIG. 2, the sections of pipe 20, 22 define lumens 24 and 26 for conducting fluid. The preferred male fitting 10 comprises a spherical shell or ball 30 having opposed openings 32 and 34 aligned with the lumen 26 of the section of pipe 22 to provide a fluid passage through the spherical shell 30. The preferred female fitting 12 comprises a hemispherical shell 36 defining a hemispherical socket 38 in fluid communication with the lumen 24 of the section of pipe 20. The hemispherical shell 30 terminates in a lip 40. The lip 40 defines a channel 42 opening toward the hemispherical socket 38 for receipt of an annular resilient seal 44 such as a rubber O-ring.

The preferred clamping sleeve 14 includes a hollow member 50 terminating in a pair of opposed eyes 52 and 54; a lever 56 pivotally coupled to the eye 52; a hook 58 pivotally coupled to the lever 56 by means of an axle 60; and another hook 62 pivotally coupled to the eye 54 by means of an axle 64.

During construction, the male fitting 10 is positioned in the hemispherical socket 38 of the female fitting 12. The clamping sleeve 14 is slid against the exposed surface of the male fitting 10. The male fitting 10 and the clamping sleeve 14 are tilted slightly to permit the hook 62 to engage the lip 40 of the female fitting 12. The hook 58 is engaged with the lip 40 on the opposite side of the female fitting 12. The lever 56 then is pivoted toward the section of pipe 22 to tighten the hook 58 against the lip 40 to press the male fitting 10 against the annular resilient seal 44 and the female fitting 12 in fluid-tight relation. Optionally, a pin 66 (FIG. 1) is slid into aligned holes (not shown) through the lever 56 and the hook 58 to secure the lever 56 and the hook 58 against pivotal movement due to fluid pressure.

FIGS. 1 and 2 illustrate a first preferred apparatus, particularly suited for connecting sections of pipe 20, 22 composed of a resilient polymeric material such as HDPE to fittings 10, 12 in accordance with the invention. Referring to FIG. 2, this preferred apparatus includes inserts 70 and 72 affixed to the fittings 10, 12 and retainers 74 and 76 placed over the external surfaces 78 and 80 of the sections of pipe 20, 22.

Figure 3A:
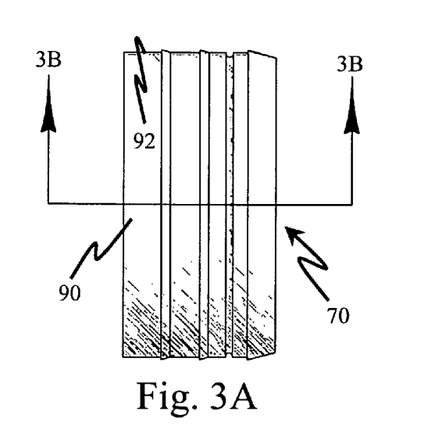
FIG. 3A is a side elevational view of a first preferred, rigid insert in accordance with the present invention.
Figure 3B:
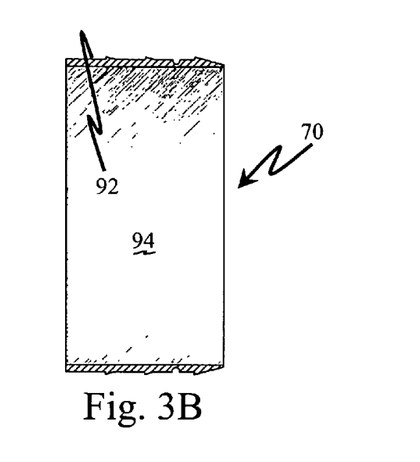
FIG. 3B is a side sectional view of the rigid insert of FIG. 3A, taken along the line 3B—3B in FIG. 3A.
Figure 4:
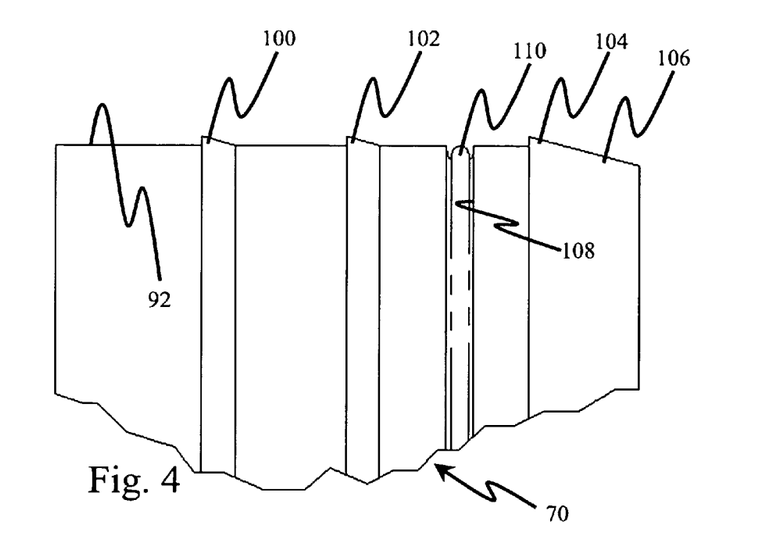
FIG. 4 is a side cutaway view of the rigid insert of FIG. 3A showing profiles of annular barbs and an annular channel formed on the outer surface of the insert.

As shown in FIGS. 3A and 3B, the preferred insert 70 comprises a generally cylindrical body 90 defining an outer surface 92 and a central lumen or flow passage 94. Most preferably, the central lumen 94 has an inner diameter sufficient to conduct fluid from the section pipe 20 (FIGS. 1 and 2) without imposing undue head loss on the flow. Referring to FIG. 4, the preferred insert 70 also includes a plurality of axially-spaced, raised detents in the form of annular barbs 100, 102 and 104. A distal end 106 of the insert 70 is chamferred.

The preferred insert 70 additionally includes an annular channel 108 positioned between the axially-spaced, raised detents 102 and 104. The annular channel is designed to receive and seat an annular seal or gasket, such as an elastomeric 0-ring seal, indicated in phantom at 110.

Figure 5A:
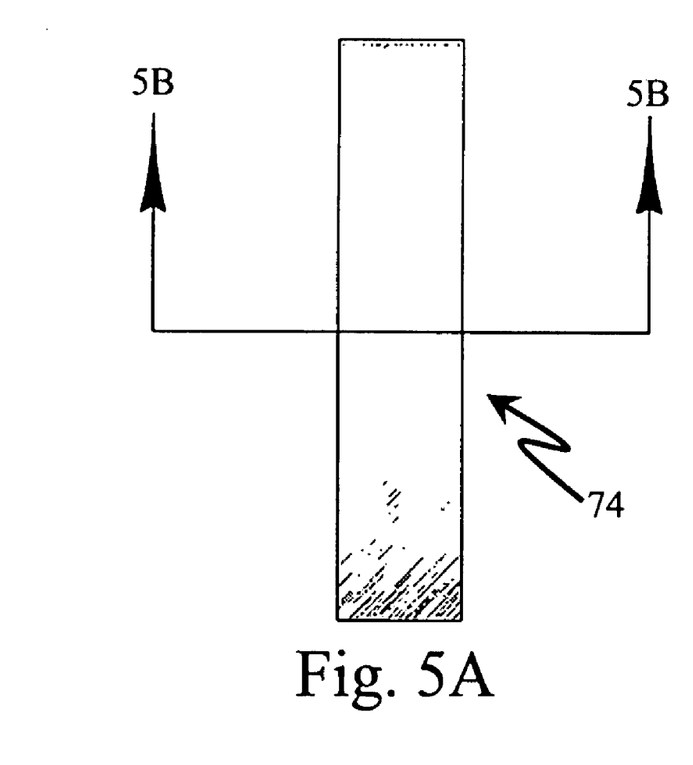
FIG. 5A is a side elevational view of a preferred, rigid, one-piece collar in accordance with the present invention.
Figure 5B:
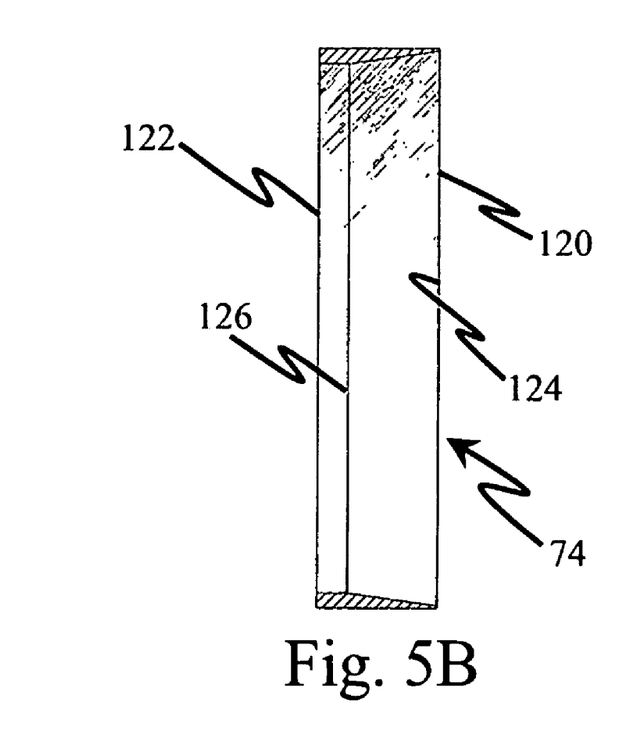
FIG. 5B is a side sectional view of the one-piece collar of FIG. 5A, taken along the line 5B—5B in FIG. 5A.

As shown in FIGS. 5A and 5B, the preferred retainer 74 is a rigid, one-piece cylindrical ring or collar defining a first end 120, a second end 122 and a central opening 124 extending from the first end 120 to the second end 122. Most preferably, the opening 124 has a minimum inner diameter slightly larger than the outer diameter of the section of pipe 20 (FIGS. 1 and 2) so as to permit the retainer 74 to be pushed over the outer surface of the section of pipe 20 during assembly but to restrict the retainer 70 from sliding over the external surface 78 (FIG. 2) of the section of pipe 20 (FIG. 2) when the section of pipe 20 (FIG. 2) is conducting fluid. In accordance with an especially preferred embodiment, the opening 124 flares from a position, identified as 126, intermediate the first and second ends 120, 122 toward the first end 120.

The preferred insert 70 and the preferred retainer 74 most preferably are formed from a high-tensile steel or stainless steel. One technique for forming the barbs 84, 86, 88 and the annular groove 90 on the exterior of the insert 70 is by machining a cylindrical blank. Other techniques for manufacturing the preferred insert 70 and the preferred retainer 74 will be apparent to those of ordinary skill in the art without resort to undue experimentation.

Figure 6A:
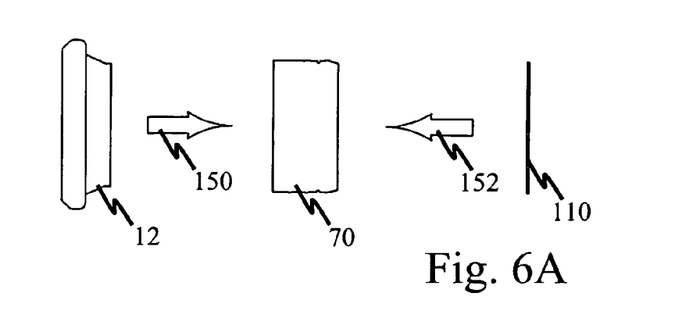
FIGS. 6A, 6B and 6C are schematic views illustrating a first preferred method for connecting a fitting to a section of pipe.

FIGS. 6A, 6B and 6C illustrate an especially preferred method for connecting the fittings 10, 12 to the sections of pipe 20, 22. In accordance with this preferred method, illustrated at reference numeral 150 in FIG. 6A, the fitting 12 is affixed, preferably by welding, to the insert 70. The central lumen 94 (FIG. 3B) of the preferred insert 70 and the hemispherical socket 38 (FIG. 2) of the fitting 12 then form a continuous flow passage through the insert 70 and the fitting 12. Most preferably, as illustrated at reference numeral 152, the annular seal 110 is positioned in the annular groove 108 (FIG. 4) of the insert 70.

Figure 6B:
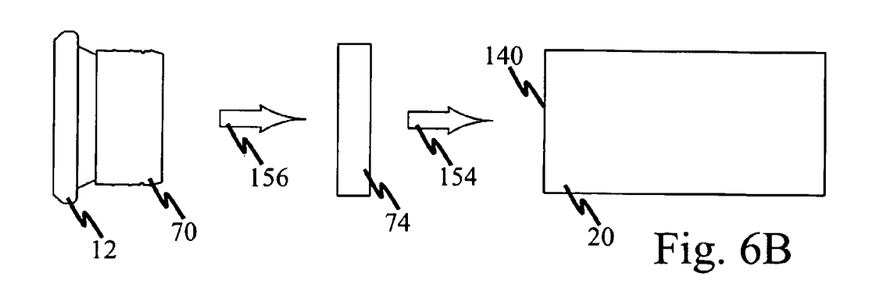

Referring to FIG. 6B and in particular to reference numeral 154, the retainer 74 is positioned over the external surface 78 of the section of pipe 20. Most preferably, the retainer 74 is positioned such that the first end 120 (FIG. 5B) of the retainer 74 faces a receiving end 140 of the section of pipe 20.

Then, as illustrated at reference numeral 156 in FIG. 6B, the insert 70 is pressed into the receiving end 140 of the section of pipe 20. Most preferably, the insert 70 is pressed into the lumen 24 using a hydraulic press, such as a hydraulic press of the same general type as those available from Henry Manufacturing of Eugene, Oreg. When such a hydraulic press (not shown) is used, the section of pipe 20 is gripped in a jaw or chuck (not shown). The preferred insert 70 is placed into a die (not shown) mounted on a ram (not shown) in alignment with the lumen 24 (FIG. 2) of the section of pipe 20. Hydraulic pressure is applied to the ram (not shown) to press the insert 70 into the section of pipe 20. The chamferring of the distal end 106 (FIG. 4) of the preferred insert 70 facilitates alignment of the insert 70 with the lumen 24 (FIG. 2) of the section of pipe 20 and insertion of the insert 70 into the section of pipe 20.

Figure 6C:
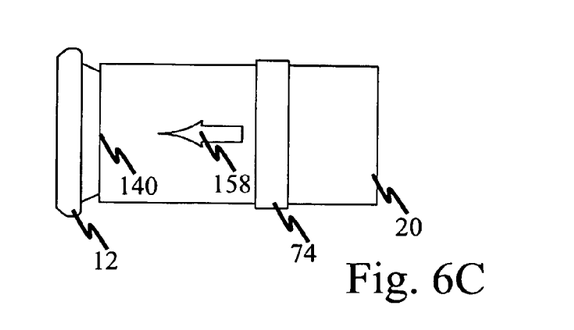

Next, as illustrated at reference numeral 158 in FIG. 6C, the retainer is pushed along the external surface 78 (FIG. 2) of the section of pipe 20 toward the receiving end 140 and the fitting 12. This step likewise preferably is performed using a hydraulic press (not shown). In this instance, the section of pipe 20 preferably is gripped near the receiving end 140 in the jaw or chuck (not shown) of the press (not shown) and the retainer 74 preferably is engaged by a die (not shown) mounted on the ram (not shown).

Most preferably, the preferred retainer 74 is pushed along the external surface 78 (FIG. 2) of the section of pipe 20 so as to substantially align the retainer 74 between the raised detents 102, 104 (FIG. 4). As suggested in FIG. 2, this may result in the retainer 74 straddling one or both of the raised detents 102, 104 (FIG. 4). In accordance with this arrangement, it is believed that the preferred retainer 74 cinches the wall of the section of pipe 20 against the outer surface 92 (FIGS. 3A, 3B and 4) of the insert 70 between the two raised detents so as to decrease the likelihood that the section of pipe 20 will come loose from the fitting 12 or leak during use. Furthermore, since the seal 110 is located between the raised detents 102, 104 (see FIG. 2), the retainer 74 tends to cinch the wall of the section of pipe 20 against the seal 110 to as to tighten the seal against leakage.

Without wishing to be bound by any theory of operation, it is believed that the retainer 74 cinches the wall of the section of pipe 20 against the insert 70 even when the section of pipe 20, the insert 70 and the retainer 74 expand or contract with change in temperature. This is particularly true when the insert 70 and the retainer 74 comprise the same material or have similar rates of thermal expansion. Consequently, the designer need not increase the wall thickness of the section of pipe 20 above the thickness required to contain the anticipated fluid pressure, thereby increasing the cost, as a means of reducing the risk of leakage due to temperature changes.

Figure 7:
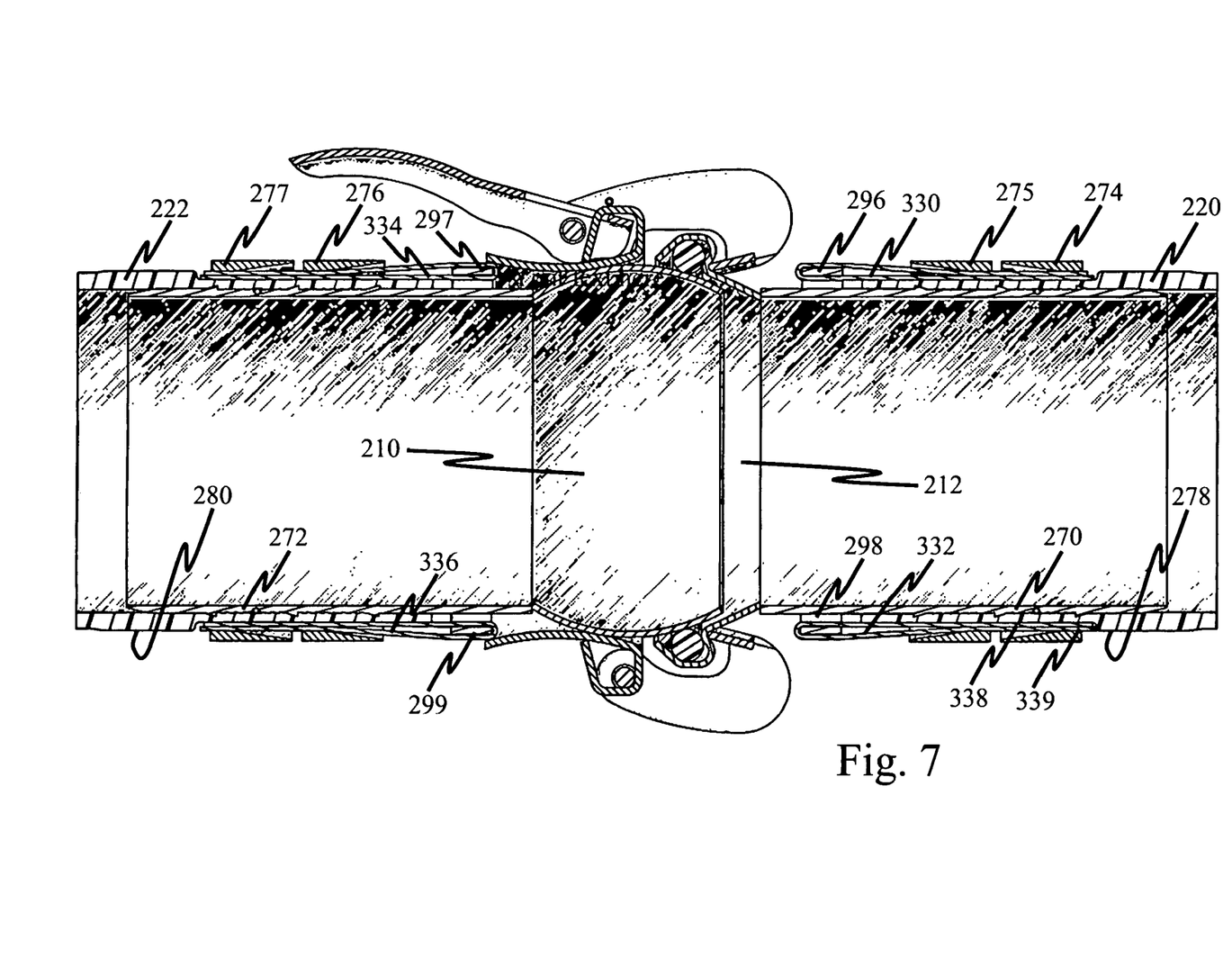
FIG. 7 is a sectional view of two sections of flexible hose coupled at adjacent ends by means of fittings connected to the sections by means of a second preferred embodiment of the present invention.

FIG. 7 illustrates a second preferred apparatus, particularly suited for connecting coupler fittings 210 and 212 to sections of flexible hose 220 and 222. (The structure of the flexible hose, which is familiar to those of ordinary skill in the art and forms no part of the present invention, is not illustrated in detail.) This second preferred apparatus includes inserts 270 and 272 affixed to the fittings 210, 212 and retainers 274, 275, 276 and 277 placed over external surfaces 278 and 280 of the sections of flexible hose 220, 222.

Figure 8A:
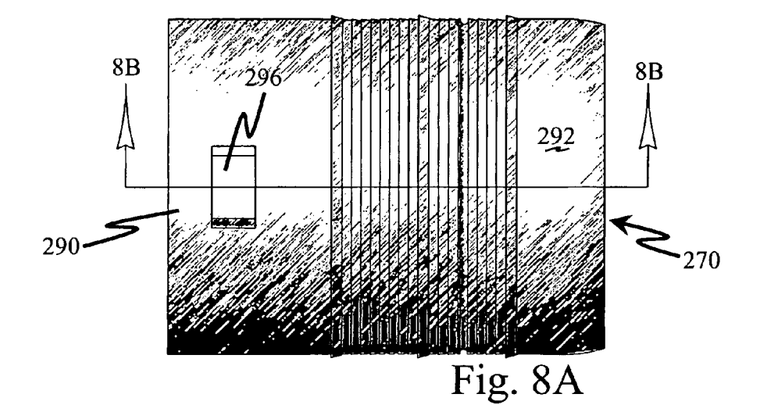
FIG. 8A is a side elevational view of a second preferred rigid insert in accordance with the present invention.
Figure 8B:
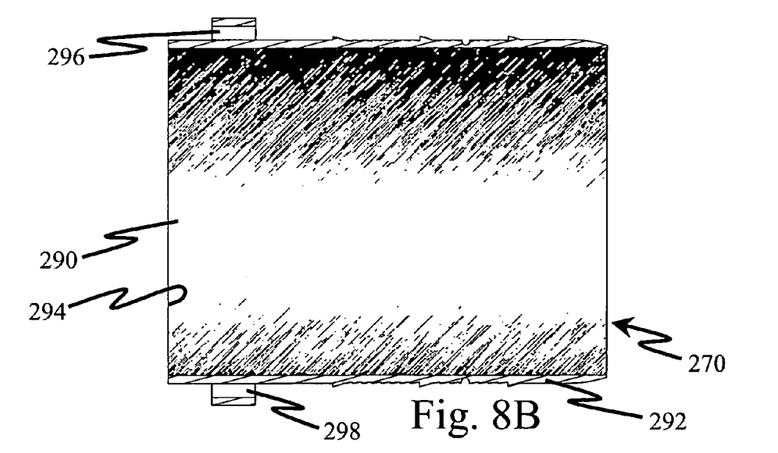
FIG. 8B is a side sectional view of the rigid insert of FIG. 8A, taken along the line 8B—8B in FIG. 3A.

As shown in FIGS. 8A and 8B, the preferred insert 270 comprises a generally cylindrical body 290 defining an outer surface 292 and a central lumen or flow passage 294. Most preferably, the central lumen 294 has an inner diameter sufficient to conduct fluid from the section of flexible hose 220 (FIG. 7) without imposing undue head loss on the flow. Optionally, the insert 270 includes a pair of staples 296 and 298. Most preferably, the staples are formed from stainless steel welded to the outer surface 290 of the insert 270.

Figure 9:
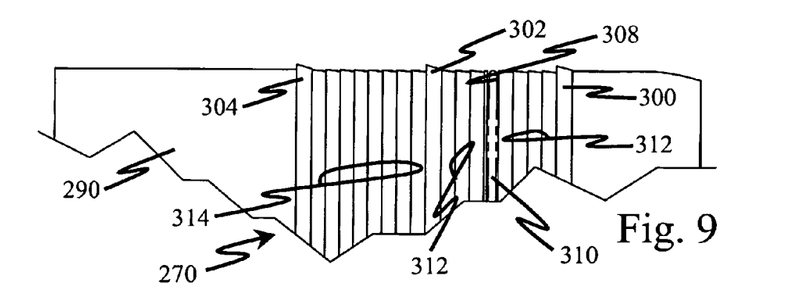
FIG. 9 is a cutaway view of the rigid insert of FIG. 3A showing profiles of annular barbs and an annular channel formed on the outer surface of the insert.

Referring to FIG. 9, the preferred insert 270 also includes first, second and third axially-spaced, raised detents in the form of annular barbs 300, 302 and 304. The annular barbs 300, 302, 304 preferably are alike in size and configuration. A distal end 306 of the insert 270 is rounded or chamferred. The preferred insert 270 further includes an annular channel 308 positioned between the axially-spaced, raised detents 300 and 302. The annular channel is designed to receive and seat an annular seal or gasket, such as an elastomeric O-ring seal, indicated in phantom at 310.

In addition, the preferred insert 270 includes a first set of smaller raised detents 312 between the first and second axially-spaced, raised detents 300, 302; and a second set of smaller raised detents 314 between the second and third axially-spaced, raised detents 302, 304. (In the particular embodiment shown in FIGS. 8A, 8B and 9, one of the smaller detents 312 is interrupted by the annular channel 308.) In accordance with an especially preferred embodiment, the two sets of smaller raised detents 312, 314 each consist of eight annular barbs. Most preferably, these annular barbs are alike in size and configuration, each being smaller in size than the first, second and third axially-spaced, raised detents 300, 302 and 304.

One technique for forming the barbs 300, 302, 304 and the annular groove 308 on the exterior of the insert 270 is by machining a cylindrical blank. Other suitable techniques will be apparent to those of ordinary skill in the art without undue experimentation.

Referring once again to FIG. 7, the preferred retainers 274, 275, 276, 277 are rigid, one-piece collars of the same construction as the retainer 70 shown in FIG. 5A and 5B. The preferred inserts 270, 272 and the preferred retainers 274, 275, 276, 277 preferably are formed of the same rigid material so as to have similar thermal expansion properties. They most preferably are formed from a high-tensile steel or stainless steel. Suitable techniques for manufacturing the preferred inserts 270, 272 and the preferred retainers 274, 275, 276, 277 will be apparent to those of ordinary skill in the art without resort to undue experimentation.

Where the inserts 270, 272 include staples 296, 297 298 and 299, the inserts 270, 272; the retainers 274, 275, 276, 277; and the sections of flexible hose 220, 222 preferably are bound together by means of straps or fetters 330, 332, 334 and 336. Strap 332, for example, includes strap end portions 338, 339. In the particular example illustrated in FIG. 7, the strap 332 passes through the staple 298. The strap 332 is bent near the staple 298 such that, in the particular example shown, the strap end portions 338, 339 align. In accordance with one embodiment, the strap end portions 338, 339 engage the retainer 298; in the particular example shown, they are trapped and held between the retainer 298 and the section of flexible hose 220. In accordance with another embodiment, one of the strap end positions 338, 339 passes between the retainer 298 and the section of flexible hose 220; that strap end portion 338, 338 is bent so as to align the two strap end portions 338, 339; and the two strap end portions 338, 339 are joined or bonded.

FIGS. 10A, 10B, 10C, 10D and 10E illustrate an especially preferred method for connecting the fittings 210, 212 to the sections of flexible hose 220, 222. In accordance with this preferred method, as illustrated at reference numeral 350 in FIG. 10A, the fitting 212 is affixed, preferably by welding, to the insert 270. Most preferably, as illustrated at reference numeral 352, the annular seal 310 is positioned in the annular groove 308 (FIG. 9) of the insert 270.

Figure 10A:
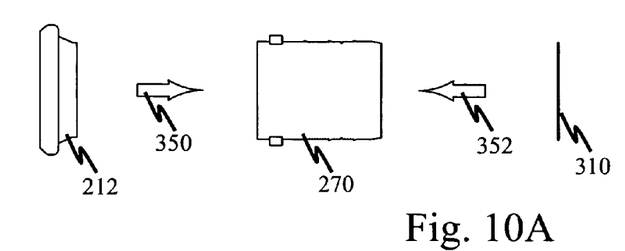
FIGS. 10A, 10B, 10C, 10D and 10E are schematic views illustrating a second preferred method for connecting a fitting to a section of flexible hose.
Figure 10B:
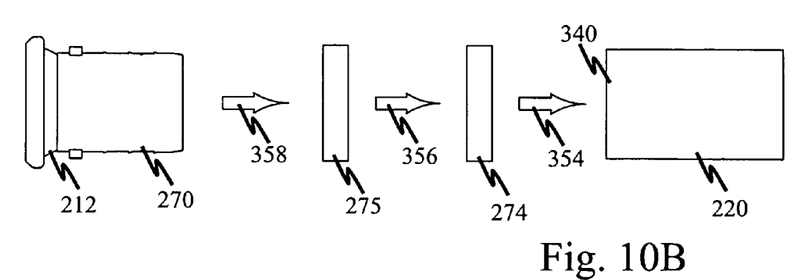

Referring to FIG. 10B and in particular to reference numerals 354 and 356, the retainers 274, 275 are positioned over the external surface 278 of the section of flexible hose 220. Most preferably, the retainers 274, 275 are so configured and positioned such that openings (not shown) through the retainers 274, 275 flare toward the ends (not shown) of the retainers 274, 275 facing a receiving end 340 of the section of flexible hose 220.

Figure 10C:
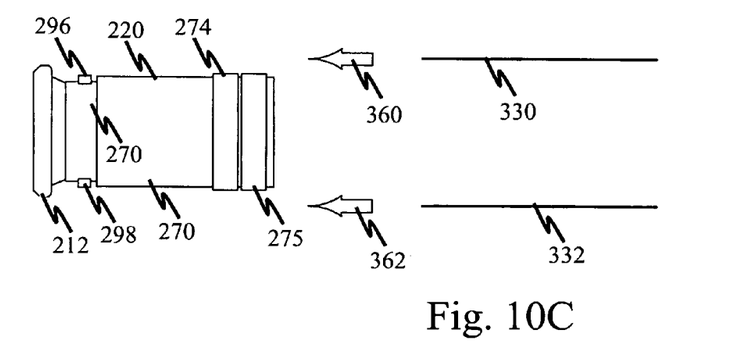

Then, as illustrated at reference numeral 358 in FIG. 10B, the insert 270 is pressed into the receiving end 340 of the section of flexible hose 220. Most preferably, the insert 270 is pressed into the section of flexible hose 220 using a hydraulic press (not shown) as discussed earlier in connection with the method illustrated in FIGS. 6A–6C.

Where the insert 270 includes staples 296, 298 mounted on its outer surface, the straps 330, 332 are threaded through the staples 296, 298 as illustrated at 360 and 362 in FIG. 10C. The straps 330, 332 are then bent or folded near the staples 296, 298 as illustrated at 364 and 366 in FIG. 10D.

Figure 10D:
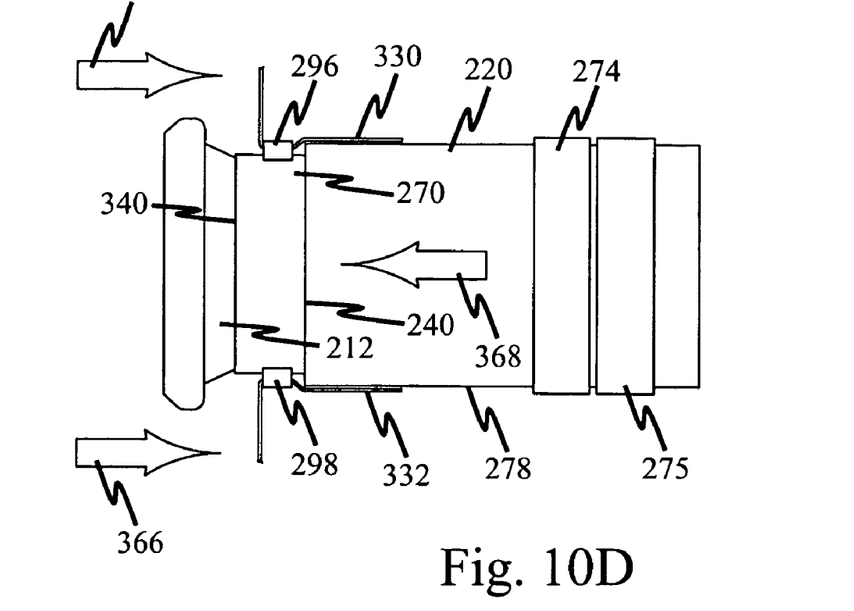
Figure 10E:
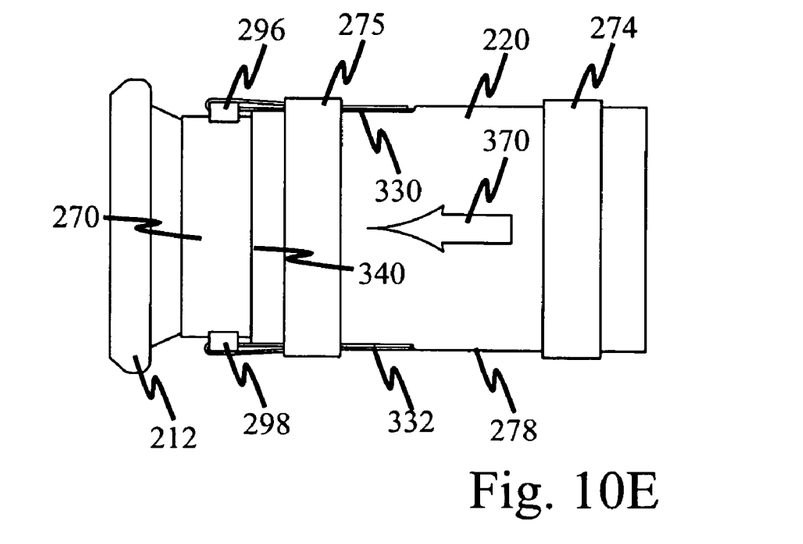

Next, as illustrated at reference numeral 368 in FIG. 10D and at reference numeral 370 in FIG. 10E, the retainers 274 and 275 are pushed along the external surface 278 of the section of flexible hose 220 toward the receiving end 340 and the fitting 212. These steps preferably are performed using a hydraulic press (not shown) as discussed in connection with the method illustrated in FIGS. 6A–6C. Where the insert 270 includes staples 296, 298 mounted on its outer surface and the straps 330, 332 are threaded through the staples 296, 298, the retainers 274, 275 preferably is pushed over the strap end portions 338, 339 (FIG. 7) such that at least one of the strap end portions engages one of the retainers 274, 275. In accordance with an alternative method, at least the retainer 275 is pushed over one of the strap end portions 338, 339 and the strap end portions are bonded or joined.

Most preferably, as discussed earlier, the preferred retainers 274, 275 are pushed along the external surface 278 (FIG. 7) of the section of flexible hose 220 so as to substantially align the retainers 274, 275 between the raised detents 300, 302 (FIG. 9) and 302, 304 (FIG. 9), respectively. It again is noted that this may result in the retainers 274, 275 straddling one or more of the raised detents 300, 302, 304 (FIG. 9). The combination of the two retainers 274, 275 substantially aligned between the axially-spaced, raised detents 300, 302, 304 (FIG. 9) provides improved protection against slippage of a flexible hose, even when subjected to high transitory pressures at the discharge end of a pumping system. Furthermore, due to the substantial alignment of the retainers 274, 275 between the axially-spaced, raised detents 300, 302, 304, the retainers 274, 276 tend to cinch the wall of the section of pipe 220 against the smaller detents 312, 314 (FIG. 9) located between the raised detents 300, 302, 304, thereby increasing the engagement between the insert 270 and the section of pipe 220 so as to reduce the likelihood of slippage. Since the seal 310 is located between the raised detents 300, 302, the retainers 274, 275 tends to cinch the wall of the section of pipe 220 against the seal 310 to as to tighten the seal against leakage.

Those skilled in the art will appreciate that the methods of the present invention provide relatively simple and inexpensive means for connecting the fittings 12 (FIGS. 6A–6C), 212 (FIGS. 10A–10D) to the conduit sections 20 (FIGS. 6A–6C), 220 (FIGS. 10A–10D). The rigid, one-piece collars 74 (FIGS. 6A–6C), 274, 275 (FIGS. 10A–10D) serve as simpler and less expensive retainers than bands or mechanical clamps. In addition, those skilled in the art will recognize that the one-piece collar 74 illustrated in FIGS. 2, 5A and 5B is inherently stronger and less likely to fail than a simple clamp.

Figure 11A:
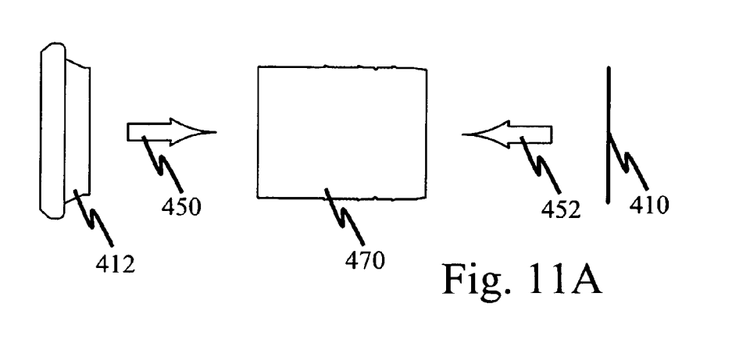
FIGS. 11A, 11B and 11C are schematic views illustrating a third preferred method for connecting a fitting to a section of flexible, in which a band or mechanical clamp is substituted for the one-piece collar of FIGS. 10A–10D.

Nevertheless, it is within the contemplation of the invention to substitute known bands or mechanical clamps for the rigid, one-piece collars 74 (FIGS. 2, 5A and 5B), 274, 275 (FIG. 7) described earlier. FIGS. 11A, 11B and 11C illustrate an especially preferred method for connecting a fitting 412 to a section of flexible hose 420 using a band or mechanical clamp. In accordance with this preferred method, as illustrated at reference numeral 450 in FIG. 11A, the fitting 412 is affixed to the insert 470, which has the same configuration as the insert 270 of FIGS. 8A, 8B and 9. Most preferably, as illustrated at reference numeral 552, an annular seal 510 is positioned in an annular groove (not shown) of the insert 470.

Figure 11B:
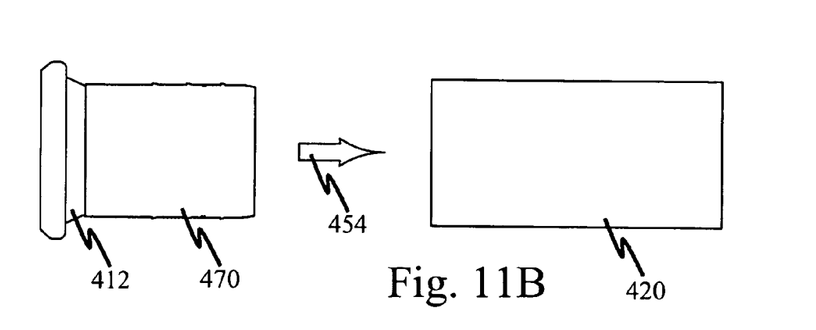
Figure 11C:
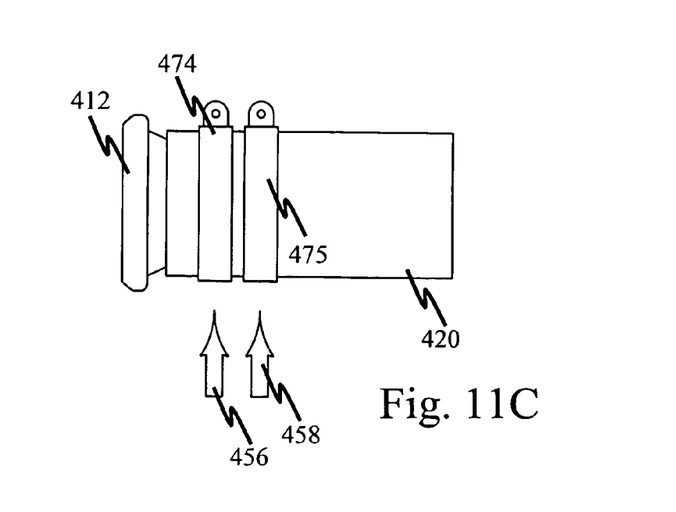

Referring to FIG. 11B and in particular to reference numerals 554, the insert 470 is pressed into a section of flexible hose 420, most preferably by means of a hydraulic press (not shown). Then, as illustrated at reference numeral 556 in FIG. 11C, retainers 474 and 475 comprising either bands or mechanical clamps are positioned over an external surface of the section of flexible hose 420 in substantial alignment between axially-spaced, raised detents (not shown) and tightened over the external surface of the section of flexible hose 420 to help secure the insert 470 in the section of flexible hose 420. Where the insert 470 mounts staples (not shown) and straps (not shown) are threaded through the staples, it is within the contemplation of the invention to position at least one of the retainers 474, 475 over at least one of the strap end portions (not shown) before tightening the retainers 474, 475.

While the preferred method and apparatus have been described in terms of metal fittings; HDPE pipe or flexible hose; a metal insert; and a metal collar, the invention is not limited to any particular set of materials. Likewise, while the preferred inserts 70 (FIGS. 3A, 3B and 4), 270 (FIGS. 8A, 8B and 9) have been described in terms of generally cylindrical bodies having annular barbs, the invention is not limited to any particular insert geometry. Furthermore, while the preferred embodiment has been described in connection with a particular type of coupler, the invention is not limited to that particular type of coupler. The conduit sections 20, 22 (FIGS. 1, 2 and 6A–6C), 220, 222 (FIGS. 7 and 10A–10D) may consist of either full sections or short "tails" designed to be welded to the ends of other sections to form full sections of pipe.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

The invention claimed is:

1. Apparatus for connecting a fitting to a conduit section comprising:
    a rigid insert having a generally cylindrical body with a proximal end and a distal end and defining a central lumen, said central lumen extending between said proximal and distal ends, said proximal end being adapted to be received in the conduit section while said distal end projects from the conduit; and
    a rigid, one piece retainer, said retainer being generally ring shaped and having an opening sufficiently large to receive the insert, said retainer having a sidewall defining a first end facing the distal end of the insert, a second end facing the proximal end of the insert, and an inner surface defining an opening extending from the first end to the second end, said sidewall having a varying thickness such that a diameter of the opening is generally constant from said second end to a position intermediate said first and second ends and then gradually increases from the position intermediate the first and second ends toward the first end.

2. The apparatus of claim 1 wherein the insert body defines a circumferential groove.

3. The apparatus of claim 1, further comprising an annular seal received in the circumferential groove.

4. The apparatus of claim 1 wherein the proximal end of the insert is chamfered.

5. The apparatus of claim 1 wherein the insert and the retainer are formed from a common material.

6. Apparatus for connecting a fitting to a conduit section comprising:
    a rigid insert defining a central lumen; and
    a rigid, one piece collar having an opening sufficiently large to receive the insert, the one-piece collar defining a first end, a second end and an opening extending from the first end to the second end, the opening flaring from a position intermediate the first and second ends toward the first end, wherein the insert includes a staple for receiving a strap.

7. The apparatus of claim 6, wherein the rigid insert is adapted to connect a fitting to a conduit section, an outer surface of the rigid insert body comprising: a first raised detent; a second raised detent axially spaced from the first raised detent; and a third raised detent between the first and second raised detents, the third raised detent being smaller than the first and second raised detents.

8. The apparatus of claim 7, wherein the insert body is generally cylindrical in shape and wherein the first, second and third raised detents are annular, raised detents.

9. The apparatus of claim 8, wherein the detents are annular barbs.

10. The apparatus of claim 7, wherein the first and second raised detents are substantially identical to one another.

11. The apparatus of claim 7, wherein the insert further comprises a fourth raised detent disposed between the first and second raised detents, wherein the third and fourth raised detents are substantially identical to one another.

12. The apparatus of claim 7, wherein the insert further comprises a fourth raised detent and a fifth raised detent; the fifth raised detent being axially spaced from the first and second raised detents; the fourth raised detent being between the fifth raised detent and one of the first and second raised detents; and wherein the fourth raised detent is smaller than the each of the first, second and fifth raised detents.

13. The apparatus of claim 7, wherein the insert further comprises a fourth raised detent and a fifth raised detent; the fifth raised detent being axially spaced from the first and second raised detents; the fourth raised detent being between the fifth raised detent and one of the first and second raised detents; the first, second and fifth raised detents being substantially identical to one another; and the fourth raised detent being smaller than each of the first, second and fifth raised detents.

14. The apparatus of claim 7, wherein the insert further comprises a fourth raised detent and a fifth raised detent; the fifth raised detent being axially spaced from the first and second raised detents; the fourth raised detent being between the fifth raised detent and one of the first and second raised detents; and wherein the third and fourth raised detents are substantially identical to one another.

15. A coupling apparatus adapted to fluidly couple a first conduit section to a second conduit section, said first conduit section defining a first conduit section lumen and said second conduit section defining a second conduit section lumen, the coupling apparatus comprising:
   a male fitting comprising a first rigid insert and a shell, said first rigid insert having a cylindrical body with a proximal end and a distal end and defining a central lumen, said shell having a proximal end and a distal end, wherein the shell proximal end is affixed to the distal end of said first rigid insert so as to extend integrally therefrom, said first rigid insert being adapted to extend into said first conduit section lumen such that said shell projects from said first conduit section;
   a female fitting comprising a second rigid insert and a socket, said second rigid insert having a cylindrical body with a proximal end and a distal end and defining a central lumen, said socket having a proximal end and a distal end, said socket proximal end being affixed to the second rigid insert distal end so as to extend integrally therefrom, said second rigid insert being adapted to extend into said second conduit section lumen such that said socket projects from said first conduit section, said socket being disposed around an exterior surface of said shell so as to receive said shell therein;
   a clamping member disposed around said shell and engaging said socket and serving to sealingly and clampingly secure the male fitting to the female fitting and thereby fluidly couple the first conduit section to the second conduit section; and,
   first and second retainers, said first retainer being disposed around said first conduit section such that a portion of said first conduit section is clampingly received between said first rigid insert and said first retainer, said second collar member being disposed around said second conduit section such that a portion of said second conduit section is clampingly received between said second rigid insert and said second retainer.

16. The coupling apparatus of claim 15 wherein each body of the first and second inserts includes first and second axially spaced apart annular, raised detents.

17. The coupling apparatus of claim 16, wherein the first and second axially-spaced, annular raised detents are annular barbs.

18. The coupling apparatus of claim 17 wherein the annular barbs are substantially identical to one another.

19. The coupling apparatus of claim 17, wherein each body of the first and second inserts further includes a third raised detent between the first and second detents, the third detent being smaller than the first and second detents.

20. The coupling apparatus of claim 17, wherein each body of the first and second inserts further includes third and fourth raised detents; the third raised detent being axially spaced from the first and second detents; the fourth raised detent being between the third raised detent and one of the first and second detents; and the fourth raised detent being smaller than any of the first, second and third detents.

21. The coupling apparatus of claim 17, wherein each body of the first and second inserts further includes third and fourth raised detents; the third raised detent being axially spaced from the first and second detents; the fourth raised detent being between the third raised detent and one of the first and second detents; the first, second, and third detents are substantially identical to one another; and the fourth raised detent is smaller than any of the first, second, and third detents.

22. The coupling apparatus of claim 17, wherein each of the inserts defines a circumferential groove disposed between the first and second detents, and wherein a seal is disposed in said circumferential groove.

23. The coupling apparatus of claim 15 wherein the socket flares from a position intermediate the proximal and distal ends and thereby defines an annular, inwardly facing groove that receives a seal.

24. A coupling apparatus adapted to fluidly couple a first conduit section to a second conduit section, said first conduit section defining a first conduit section lumen and said second conduit section defining a second conduit section lumen, the coupling apparatus comprising:
   a male fitting comprising a first rigid insert and a shell, said first rigid insert having a cylindrical body with a proximal end and a distal end and defining a central lumen, said shell having a proximal end and a distal end, wherein the shell proximal end is affixed to the distal end of said first rigid insert so as to extend integrally therefrom, said first rigid insert being adapted to extend into said first conduit section lumen such that said shell projects from said first conduit section;
   a female fitting comprising a second rigid insert and a socket, said second rigid insert having a cylindrical body with a proximal end and a distal end and defining a central lumen, said socket having a proximal end and a distal end, said socket proximal end being affixed to the second rigid insert distal end so as to extend integrally therefrom, said second rigid insert being adapted to extend into said second conduit section lumen such that said socket projects from said first conduit section, said socket being disposed around an exterior surface of said shell so as to receive said shell therein;
   a clamping member disposed around said shell and engaging said socket and serving to sealingly and clampingly secure the male fitting to the female fitting and thereby fluidly couple the first conduit section to the second conduit section; and,
   first and second straps defining strap end portions, wherein the first insert includes a first staple and the second insert includes a second staple; and wherein the first strap passes through the first staple and is received between the first collar and the first conduit section and the second strap passes through the second staple and is received between the second collar and the second conduit section.

25. A fitting in combination with a conduit, comprising:
a conduit section defining a conduit section lumen;
a fitting, comprising:
   a rigid insert defining a central lumen, the rigid insert extending into the conduit section lumen;
   a coupling portion affixed to the insert and projecting from said conduit section lumen, said coupling portion being adapted to receive a mating coupling portion extending from an associated conduit section; and
a rigid, one piece retainer, said retainer being generally ring shaped and having an opening sufficiently large to receive the insert, said retainer having a sidewall defining a first end facing the distal end of the insert, a second end facing the proximal end of the insert, and an inner surface defining an opening extending from the first end to the second end, said sidewall having a varying thickness such that a diameter of the opening is generally constant from said second to a position intermediate said first and second ends and then gradually increases from the position intermediate the first and second ends toward the first end.

26. The combination of claim 25, further comprising a seal disposed between the insert and the conduit section.

27. The combination of claim 25, wherein the rigid insert has a generally cylindrical body, said body defining a circumferential groove disposed between two axially-spaced, raised detents, and wherein an annular seal is received in the circumferential groove.

28. The combination of claim 27, wherein the retainer is aligned with the seal and cooperates with the insert so as to urge the seal into sealing engagement with the conduit section.

29. Apparatus comprising:
a conduit section defining a conduit section lumen;
a fitting;
a rigid insert defining a central lumen, the rigid insert being affixed to the fitting and extending into the conduit section lumen;
a rigid, one-piece retainer positioned over the conduit section, the one-piece retainer defining a first end, a second end and an opening extending from the first end to the second end, wherein the opening flares from a position intermediate the first and second ends toward the first end, and the first end faces the fitting; and, a strap defining strap end portions, wherein the insert includes a staple, the strap passes through the staple, and one of the strap end portions engages the one-piece retainer.

30. Apparatus comprising:
a conduit section defining a conduit section lumen;
a fitting;
a rigid insert defining a central lumen, a first raised detent, a second raised detent axially spaced from the first raised detent and a third raised detent axially spaced from the first and second raised detents, the rigid insert being affixed to the filling and extending into the conduit section lumen;
a first retainer positioned over the conduit section in substantial alignment between the first and second raised detents; and
a second retainer positioned over the conduit section in substantial alignment between the second and third raised detents;
wherein the first retainer has a first end, a second end and an opening extending from the first end to the second end, the opening flaring from a position intermediate the first and second ends toward the first end; and the first end of the first retainer faces the fitting.

31. The apparatus of claim 30 wherein the insert includes a generally cylindrical body; and the first and second raised detents are annular, raised detents.

32. The apparatus of claim 30 wherein the insert includes a generally cylindrical body; and the first and second raised detents are annular barbs.

33. The apparatus of claim 30 including a seal mounted on the insert between the first and second raised detents.

34. The apparatus of claim 30 including an annular seal, wherein the insert includes a generally cylindrical body and an annular groove between the first and second raised detents; and the annular seal is seated in the annular groove.

35. The apparatus of claim 30 wherein the insert defines a fourth raised detent between the first and second raised detents, the fourth raised detent being smaller than the first and second raised detents.

36. The apparatus of claim 30 wherein the insert defines a fourth raised detent and a fifth raised detent, the fourth and fifth raised detents being between the first and second raised detents; and the fourth and fifth raised detents being smaller than the first and second raised detents.

37. The apparatus of claim 30 including a fourth raised detent and a fifth raised detent; the fourth raised detent being between the first and second raised detents; the fifth raised detent being between the second and third raised detents; the first, second and third raised detents being substantially the same in size and configuration; and the fourth and fifth raised detents being smaller than the first, second and fifth raised detents.

38. The apparatus of claim 30 including a fourth raised detent and a fifth raised detent; the fourth raised detent being between the first and second raised detents; the fifth raised detent being between the second and third raised detents; the fourth and fifth raised detents being smaller than the first, second and third raised detents; and the fourth and fifth raised detents being substantially the same in size and configuration.

39. Apparatus comprising:
a conduit section defining a conduit section lumen;
a fitting;
a rigid insert defining a central lumen, a first raised detent, a second raised detent axially spaced from the first raised detent and a third raised detent axially spaced from the first and second raised detents, the rigid insert being affixed to the fitting and extending into the conduit section lumen;
a first retainer positioned over the conduit section in substantial alignment between the first and second raised detents;
a second retainer positioned over the conduit section in substantial alignment between the second and third raised detents; and, a strap defining strap end portions, wherein the insert includes a staple; the strap passes through the staple; and one of the strap end portions engages the one of the first and second retainers.

* * * * *